Figure 1A:
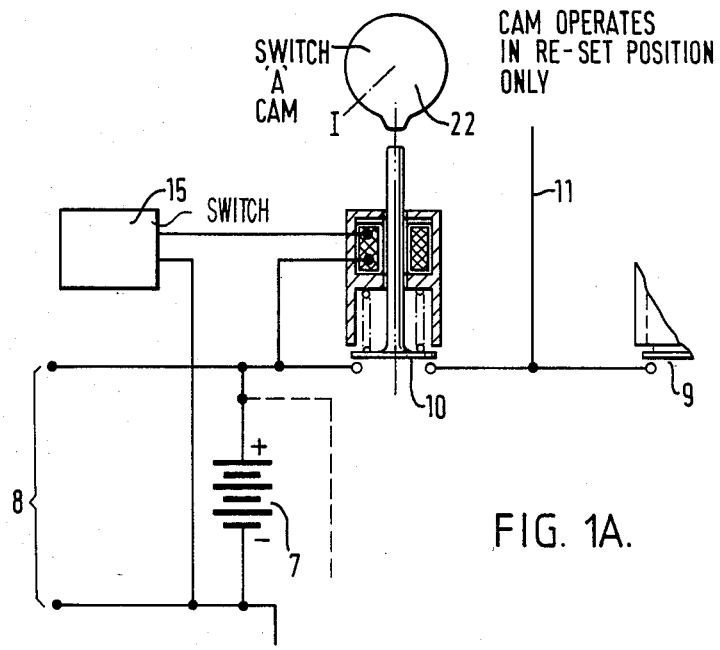

United States Patent [19]

Wickham

[11] Patent Number: 4,644,180
[45] Date of Patent: Feb. 17, 1987

[54] ACTUATOR EMERGENCY OPERATION

[75] Inventor: David J. Wickham, Chippenham, United Kingdom

[73] Assignee: Westinghouse Brake and Signal Company, Ltd., Wiltshire, England

[21] Appl. No.: 793,857

[22] Filed: Nov. 1, 1985

[30] Foreign Application Priority Data

Nov. 8, 1984 [GB] United Kingdom ............... 8428289

[51] Int. Cl.⁴ .................. H02J 7/00; F16D 65/36
[52] U.S. Cl. ............................. 307/66; 307/9;
    307/10 R; 307/64; 361/31; 361/189; 188/163;
    188/156; 188/157
[58] Field of Search ............ 307/9, 10 R, 66, 85,
    307/64; 361/21, 23, 24, 30, 31, 33, 160, 166,
    167, 189, 190, 191, 192, 193; 246/167 R, 182 R,
    182 A, 182 B, 182 BH; 188/157-158, 161, 163,
    164, 171, 173, 156

[56] References Cited

U.S. PATENT DOCUMENTS

| | | | |
|---|---|---|---|
| Re. 23,896 | 11/1954 | Higgins | 361/189 X |
| 1,962,369 | 6/1934 | Taliaferro | 361/31 X |
| 2,052,201 | 8/1936 | Logan et al. | 188/156 |
| 2,172,116 | 9/1939 | Warren | 188/156 X |
| 2,500,939 | 3/1950 | Exner | 361/33 X |
| 2,683,225 | 7/1954 | Lamm et al. | 307/64 |
| 2,826,705 | 3/1958 | Lichtenfels et al. | 307/64 X |
| 3,017,965 | 1/1962 | Hill | 188/163 |
| 3,111,185 | 11/1963 | Butler | 361/189 X |
| 3,636,375 | 1/1972 | Armstrong | 361/191 X |
| 3,898,547 | 8/1975 | Poole | 361/192 X |
| 4,031,439 | 6/1977 | Sakai et al. | 361/31 X |
| 4,412,137 | 10/1983 | Hansen et al. | 307/10 R |

Primary Examiner—William M. Shoop, Jr.
Assistant Examiner—Shik Luen Paul Ip
Attorney, Agent, or Firm—Larson and Taylor

[57] ABSTRACT

Electrical circuit configurations are described for the operation of an electrically powered actuator in an emergency to drive the actuator to a predetermined position. In particular the actuator is connected to apply friction brakes of a railway vehicle. The configurations have in common are emergency power circuit connected between an emergency power source and the actuator, means for breaking the power circuit when the actuator reaches the emergency position and latching means to prevent run-back. Preferably and in order to minimize size and weight the emergency power source is of limited capacity, sufficient for, say, two such emergency applications and is recharged from a normal power supply; the recharging circuit being interlocked with the latching means such that the actuator may not be released from the emergency position unless the power source has sufficient charge for at least one further emergency operation.

7 Claims, 5 Drawing Figures

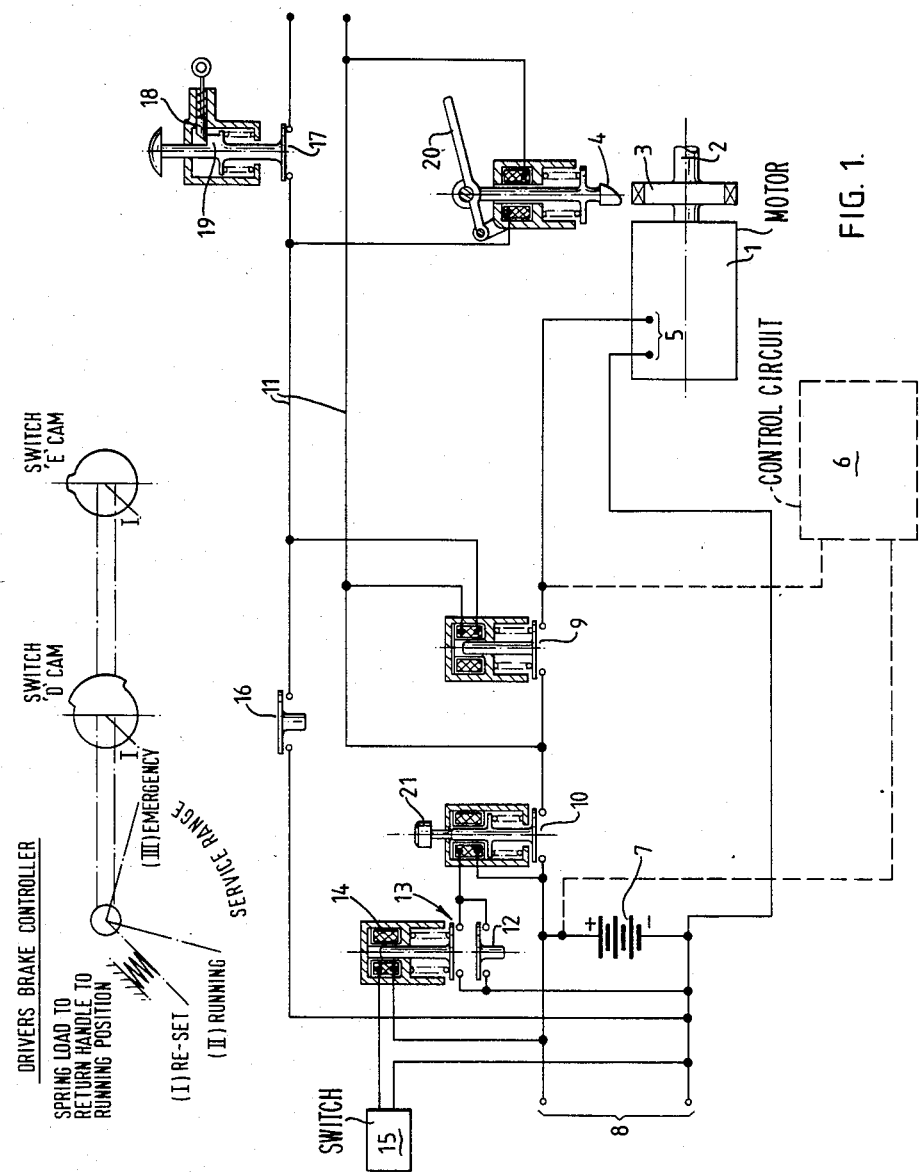

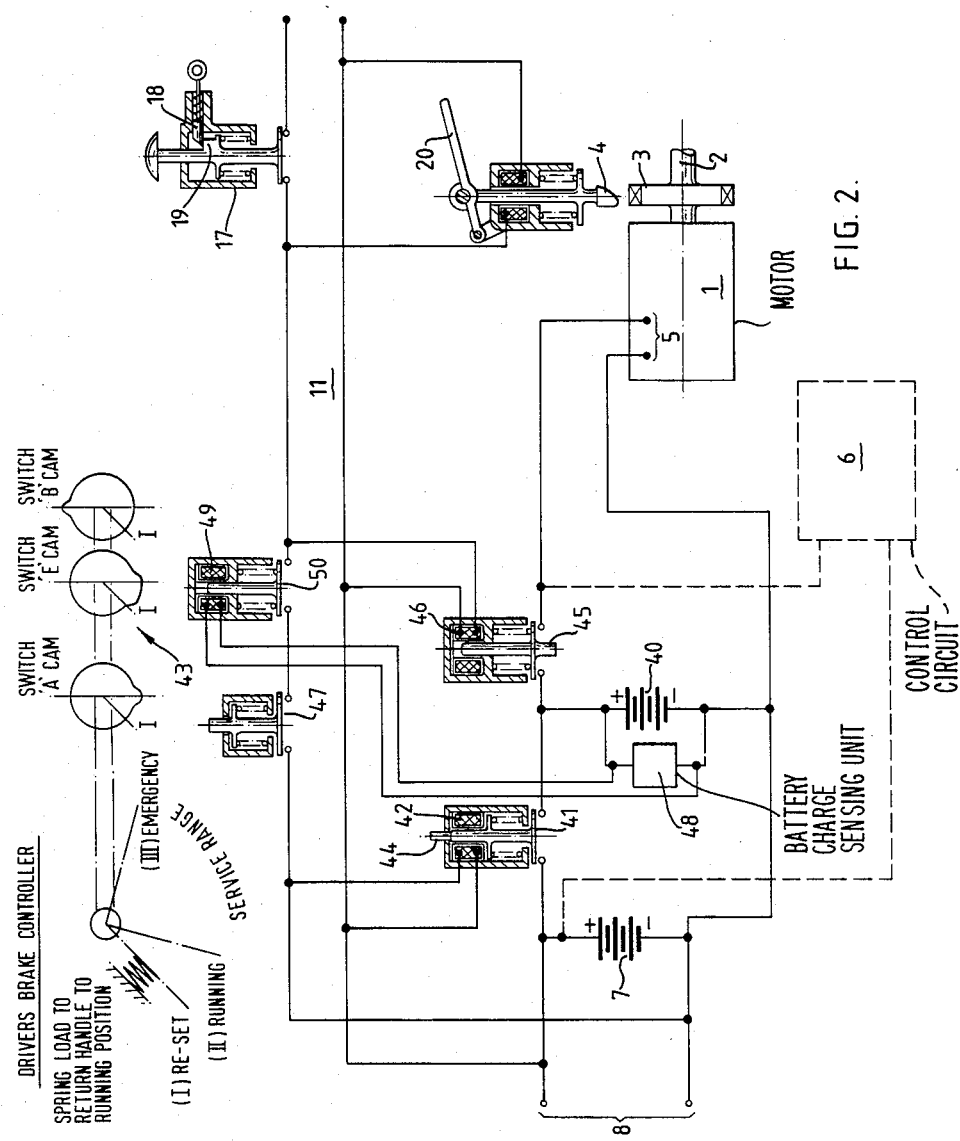

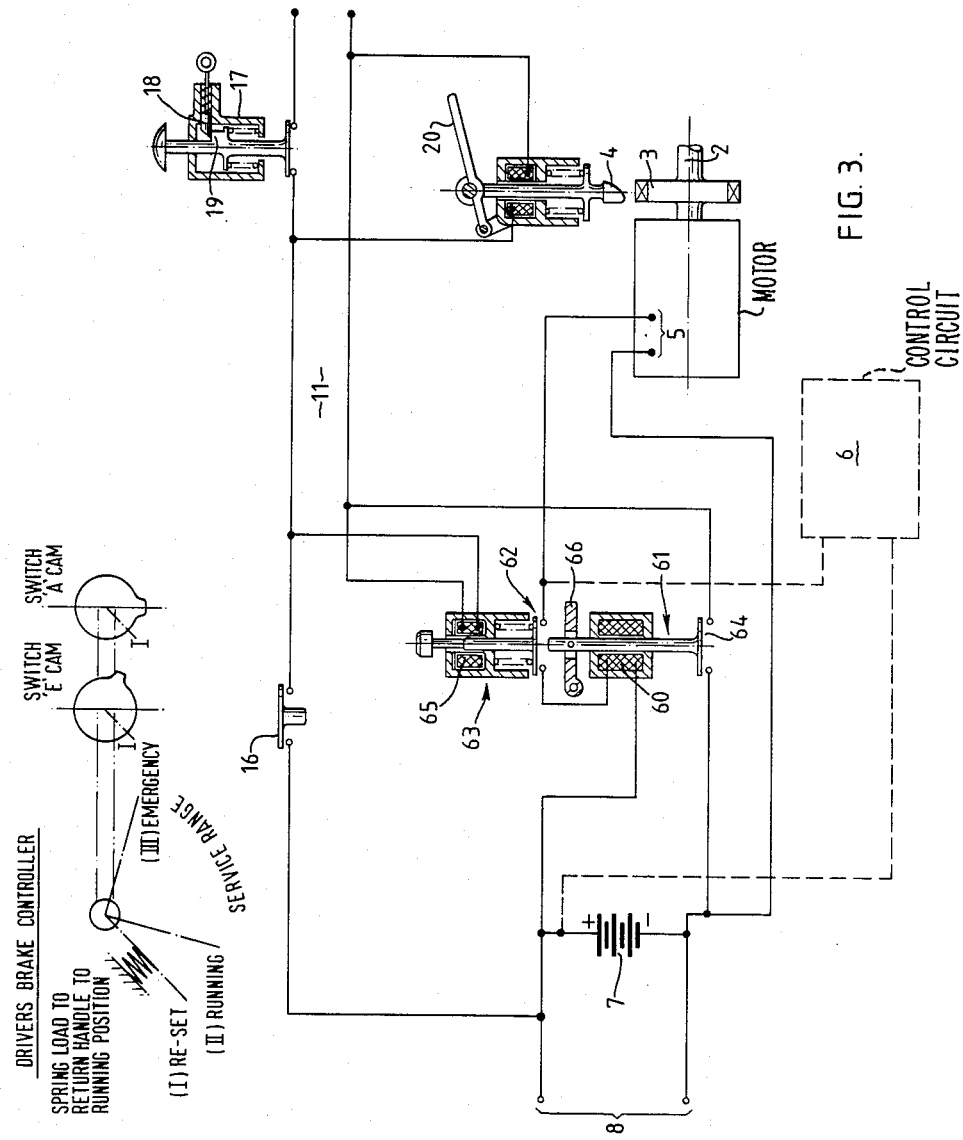

ACTUATOR EMERGENCY OPERATION

The invention relates to an actuator emergency operation circuit, particularly for an electric actuator and especially a railway vehicle brake actuator employing a direct acting electrical machine.

In actuator driven circuits it is commonly required, in the event of an emergency occurring, to drive the actuator to a predetermined safe position and to maintain it in such position until the causes of the emergency have been cleared. For example, in a vehicle brake system such as found on railway vehicles it is required to make a full emergency brake application in the event of certain occurrences, such as separation of the railway vehicles, and loss of normal brake control.

In an emergency brake application the machine is driven to a furthest extent of its movement, in which the brakes are applied.

According to the present invention there is provided an actuator emergency operation circuit comprising a source of electrical energy, an emergency power circuit connected between the source and an actuator and operative in an emergency to deploy the actuator to a predetermined position, first means operative after deployment of the actuator to open the emergency circuit, and second means operative after deployment of the actuator to latch the actuator in the said predetermined position.

Preferably the means for latching the actuator is responsive to operation of the emergency power circuit to permit deployment of the actuator only towards the predetermind position. Said means may comprise a one-way clutch or a ratchet arrangement.

Further, the source of electrical energy may comprise means for holding a limited electrical charge sufficient to drive the actuator to the emergency position and there may be provided a recharging circuit supplied from the normal control circuit power supply and interlocked with the means for latching the actuator to prevent its release when the source of electrical energy is discharged.

The invention and how it may be carried into practice will now be described with reference to the accompanying drawings, in which FIGS. 1, 2 and 3 show electrical circuit diagrams of three alternative embodiments of the invention.

Referring now to FIG. 1 there is shown an actuator emergency operation circuit for a direct acting electrical actuator of a railway vehicle brake. The basis of the actuator is an electric motor 1 which drives rotatably through an output shaft 2 and a step-down gearbox (not shown) to a brake operating a member connected to effect movement of brake rigging (also not shown) for application and release of the brakes. In one such arrangement a captive nut connected with the brake operating member is engaged with a screw thread formed on the output shaft of the gearbox. A ratchet wheel 3 is mounted on the shaft 2 and has peripheral teeth engageable by a pawl 4 which will be described in greater detail below.

The electric motor 1 is energised via a pair of connections, generally indicated at 5, which are connected in circuit with a service brake control unit 6 and a source of electrical energy 7, e.g. a battery and terminals 8 between which the battery 7 is connected. The construction and operation of the service brake control unit 6 does not form part of the invention, however, for further information in this respect, reference is directed towards co-pending U.S. patent application No. 721,915, filed on Nov. 4, 1985. The battery 7 is, in normal operating circumstances continuously recharged by current from a charging circuit (not shown) connected to the terminals 8.

The pawl 4 is also operated by a spring applied, solenoid actuated arrangement in which the pawl may be held in a retracted position against the bias of a spring by means of a solenoid the energising terminals of which are connected across the emergency line 11 conductors. The pawl 4 may also be released from the ratchet wheel 3 by means of a manual lever 20.

The emergency operation circuit of FIG. 1 comprises a spring biased closed switch 9 having an operating solenoid energisable to open the switch contacts; a spring biased open switch 10 having an operating solenoid energisable to close the switch contacts and a push-button for manual closure of the contacts; an emergency line 11 comprising a pair of conductors connected across the emergency battery 7 and in series with the contacts of switch 10. The solenoid of switch 9 is connected between the conductors of the emergency line 11, and the solenoid of switch 10 is connected across the battery 7 through two switched paths, a first of which contains a normally open contact 12, which may be closed mechanically by a cam carried by a driver's brake handle when it is moved to a re-set position, and a second path containing a spring closed contact openable by a solenoid which is, in turn connected across the supply terminals 8 through a switch which is closed by the action of the brake actuatdr reaching its predetermined emergency position. The supply connection to the emergency line 11 is connected through a normally closed contact 16 which may be opened mechanically by a cam carried by the driver's brake handle when it is moved to an emergency position.

Also in the emergency conductor line 11 there is a plurality of emergency switches 17, of which one is shown in FIG. 1, which are provided for example for operation by vehicle passengers. This switch 17 comprises a pair of contacts which are normally latched open against a resilient spring bias by engagement of an emergency pin 18 with an abutment 19 on the switch armature.

The operation states of the emergency circuit are of particular interest, that is, the normal running state with brakes released and the emergency braking state. Intermediate there is a third state in which the emergency circuit is as in the running state but in which the service brake control unit 6 operates the actuator motor 1 according to the required degree of service brake application.

In the normal running state, the operation of FIG. 1 is as follows: a supply voltage is present at the terminals 8 which initially charges-up battery 7 and thereafter maintains it in a charged state; the switch 13 is closed energising the solenoid of switch 10 to close its contacts, connecting the conductors of emergency line 11 to the supply voltage, the switch 16 operated by the driver's brake handle is closed in all positions except the emergency brake demand positions and the switch or switches 17 are latched in the closed position, thus a circuit is established through the emergency conductor line 11; the switch 9 is therefore normally energised holding its sprung contacts open and the ratchet solenoid is similarly energised holding the pawl 4 disengaged to permit normal bi-directional movement of the actuator shaft 2.

The emergency circuit is brought into operation, and the emergency braking circuit, basically by the disappearance of energising volts from the emergency line 11 thereby releasing switch 9 to close under spring pressure and connect the fully charged battery 7 directly across the terminals 5 of the motor 1. The motor 1 then proceeds to drive to an extreme position exerting maximum force on the brake rigging to bring into effect emergency braking. Simultaneously with the closing of switch 9 the ratchet solenoid is also de-energised and the pawl 4 engages the ratchet wheel 3 to prevent runback of the actuator motor 1 from the emergency brake position.

If the power supply to the motor were maintained, or even could be guaranteed under all conditions, the motor 1 could be permitted to maintain the emergency braking position in a stalled condition, although this would require a more substantial motor construction than is needed with the ratchet, and a larger battery. Anyway, since the supply voltage to terminals 8 can be lost, e.g. by vehicle separation, giving rise to emergency brake operation the battery 7 may be eventually discharged and the brake actuator would need then to be effectively locked in the emergency brake position.

It is arranged that the switch 15 shall be closed by the actuator in the emergency braking position thus energising solenoid 14 to open the switch 13; since contacts 12 are also open the solenoid of switch 10 is de-energised permitting the switch to be opened by its bias spring. This action breaks the circuit to the motor 1 and the emergency line 11, preventing a potential current drain from the battery 7. If the power supply is still connected to terminals 8 the battery 7 will be re-charged, and if not the early isolation of the battery will ensure that sufficient charge is retained for at least one further emergency brake application.

As already indicated an emergency brake application is brought about by release of one of the emergency switches 17, or movement of the driver's brake control to the emergency position to open contact 16, or disconnection the power supply to terminals 8 e.g. by vehicle separation. To restore the system to the normal running postion whichever of the three events which precipitated the emergency action is first re-instated, then the brake system may be released. The brake control handle must be moved in a "RE-SET" position turning a cam which, in that position, closes the contact 12 energising the solenoid of switch 10 closing its contacts and reconnecting voltage to the emergency line 11. Following this the switch 9 is re-opened, by energisation of its solenoid, thus removing emergency power from the motor 1, and the ratchet solenoid is re-energised to disengage the pawl 4 now permitting the actuator to run-back freely. During this time the actuator re-opens the cut-off switch 15, de-energising the coil 14 and re-closing switch 13, thus when the brake control handle is allowed to return to a normal running or service brake position the coil of switch 10 remains energised.

Preferably the actuator ratchet is provided with a manual release handle 20 which can be used, for example, to temporarily release the brakes of a parked vehicle. Also the switch 10 has a manual push-button 21 by means of which, when it is depressed, power is temporarily reconnected to the emergency line 11.

By means of this arrangement the emergency line, the drivers brake controller, a brake position sensor and the emergency battery are interlocked to provide failure to safety in use. The brakes cannot be released if volts cannot be re-established in the emergency line 11 because, in that case, the ratchet mechanism will not disengage, except by manual operation. In order to re-establish the voltage the brake controller 16 must be returned from the emergency position and the switch 10 closed, this only being possible when its operating solenoid can be energised when several conditions are met. Firstly, sufficient voltage must exist across the terminals of battery 7 when the contact 12 is momentarily closed by movement of the brake controller to the re-set position. If all is well, this re-establishes voltage on the line 11, opening switch 9 and disengaging the ratchet lock. Then, when the actuator begins to run back the sensor switch 15 opens and switch 13 closes to reconnect solenoid of switch 10 across the battery supply voltage.

However, if the battery voltage is too low switch 10 will not stay closed, or if switch 10 is closed manually, by means of the push-button 21 the ratchet will not be released thus the brakes will remain locked in the emergency position. Alternatively, should there be sufficient voltage but the sensor 15 fails to indicate brake release by remaining closed, e.g. because the contacts are shorted together, then contact 13 remains open and, since contact 12 is only momentarily closed switch 10 will not stay closed so that the emergency line will be merely pulsed and the system will tend to hold emergency brake applied. In the event that the sensor switch 15 fails open-circuit, e.g. due to a broken contact, switch 13 will remain permanently closed and therefore the solenoid of switch 10 permanently in circuit so that that switch will be closed to energise the emergency line 11 when the voltage of battery 7 is sufficient, and will open when the battery voltage falls below a critical level. This critical level is determined by sufficient charge in the battery to ensure that the brake actuator can still be driven fully to the emergency brake position.

Figure 1B:
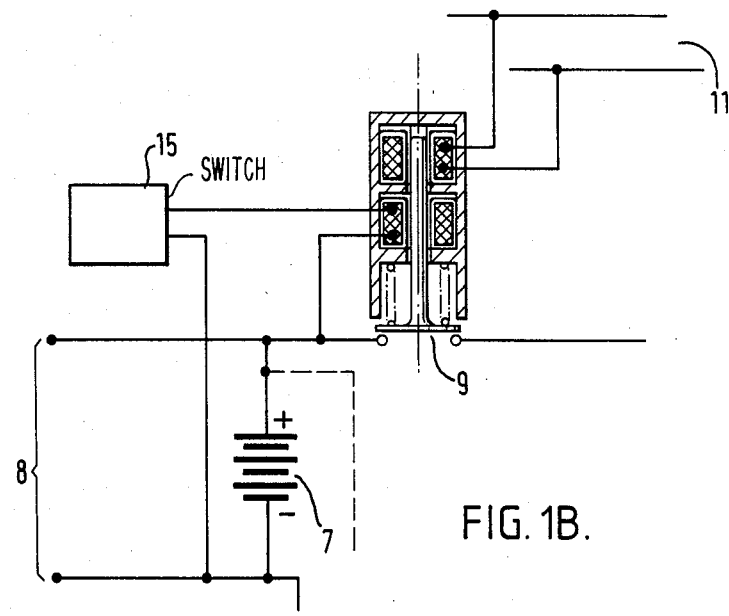

Modifications to the emergency power circuit arrangement of FIG. 1 are illustrated in FIGS. 1a and 1b, in which like parts have like references, and will now be described.

In modified arrangement of FIG. 1a, as compared to the basic arrangement of FIG. 1, the contacts 12 and 13, and the solenoid 14 for operating the latter, are omitted and the switch 15 is connected to operate the solenoid of switch 10 directly. Also, the manual push-button 21 is replaced by push-rod bearing against a cam 22 carried on the spindle of the driver's brake control handle, the contacts 10 are therefore forcibly closed when the cam 22 is turned to the re-set position, overcoming the operating force exerted by the energised solenoid. The sensor switch 15 is normally closed with the brake actuator in the emergency position, when the brake control handle is turned to the re-set position, and the contact 10 forcably closed allowing the actuator to be released and to run-back, then the switch 15 will open de-energising the coil so that the contact 10 will remain closed under the action of its bias spring. In this way the operation of the sensor switch 15 is interlocked with energisation of the emergency line 11. If the switch fails to open the coil of switch 10 remains energised and it will immediately open and de-energise the emergency line 11 when the brake control handle is moved from the re-set position. If, on the other hand, the switch 15 fails open the contact 10 will remain permanently closed in readiness for an emergency brake application to be determined by the state of the remainder of the system.

FIG. 1b shows a further modification of the circuit of FIG. 1, in which the electrical operating mechanism for switch contacts 9 involve a modification which permits the contacts 10 to be dispensed with, and also a separate re-set position for the brake controller. The switch 9 is again spring biased towards the closed position but is provided with two operating coils either, or both, of which may be energised to open the switch 9. The sensor switch 15 is connected in circuit with a first of the coils across the supply of battery 7, so that the contact 9 is open when the actuator is driven to the emergency brake position; and a second of the coils is connected to be energised by the emergency line 11, so that a sufficient voltage on this line also acts to open switch 9. Therefore, in the normal running position with sensor switch 15 open, loss of volts on the emergency line 11 will result in the switch 9 closing.

A second emergency power circuit arrangement is illustrated in FIG. 2, the basis of this arrangement is a limited capacity charge storage device 40, e.g. a relatively small re-chargeable battery. This device 40 is connected in parallel with the main emergency battery 7 but is normally isolated therefrom by a contact 41, normally biased open circuit but which may be closed by energisation of a operating coil 42, or by movement of a cam 43 carried by a drivers brake controller bearing against a contact push-rod 44; the device 40 is also isolated from the terminals 5 of motor 1 by a further contact 45, which is spring biased to the closed position but is normally held open by energisation of a coil 46 connected to the emergency line 11.

The operating coil 42, for the contacts 41, is connected effectively to the voltage supply at terminals 8, whereas the operating coil 46 for the contacts 45 is connected to a switched part of the emergency line 11 on the opposite side of an emergency brake contact 47, which is normally held closed by the brake controller against a spring bias but which is released to open when the controller is moved to the emergency brake position. A sensing unit 48 is connected in parallel with the device 40 and is responsive to the state of charge of that device and is connected to control energisation of a coil 49 which operates to close a further switch 50 in the emergency line, this switch being normally biased open circuit and being maintained in the closed position by coil 49, providing a predetermined level of charge of device 40 is sensed by the unit 48.

In the normal running condition, with brakes released, the contacts 47 and 50 are closed so that the emergency line 11 is energised, and the contact 41 is closed so that the storage device 40 is maintained in a fully charged state. The contact 45 is open circuit thus isolating the charge storage device 40 from the actuator motor 1.

In the event of an emergency situation arising the coil 46 becomes de-energised by loss of volts on the emergency line 11 and the contact 45 closes, over-riding any service brake application demand, and driving the actuator to the emergency brake position as before. Loss of voltage on the emergency line 11 may come about in several ways, as before, either by a loss of supply to the terminals 8, by movement of the brake controller to the emergency position releasing contact 47 from the closed position to the open position, or by operation of the switch 17.

If the voltage supply to terminals 8 has remained intact the contact 41 remains closed and storage device 40 is automatically recharged and the contact 50 has not opened. Therefore as soon as either the contact 47 is reclosed or the switch 17 reclosed the ratchet will be disengaged, and the coil 46 re-energised to re-open the contact 45 disconnecting the emergency power supply from the motor. If the voltage supply to terminals 8 has been disconnected the contact 41 will open whilst the contact 45 is closed, should the storage device 40 discharge below a critical level, then the sensing unit 48 will permit the contact 50 to open and will hold that state until the device has been sufficiently recharged. Therefore while device 40 is discharged the ratchet may not be automatically disengaged by reconnection of the power supply to terminals 8 even if the contact 47 is re-closed by movement of the controller. Recharging of the device 40 will take place as a result of re-closure of contact 41 when the supply is restored to terminals 8. This arrangement dispenses with the sensor switch 15 responsive to the mechanical position of the actuator.

A third embodiment of an emergency power circuit is illustrated in FIG. 3, in which like parts again have like references. The emergency power battery is connected in a circuit to the motor terminals 5 through the operating solenoid 16 of a solenoid toggle action switch, generally indicated at 61, and the contact 62 of a further spring bias solenoid operated switch 63 in one circuit line and in the return line via contact 64 of the switch 61. The operating solenoid 65 of the switch 63 is connected to be energised by the emergency line 11 and also has a push-button for manual closure of the contacts 63 against the operating force of the solenoid 65.

The switch 61 is also provided with a push rod adapted to mechanically open the contact 62 of the switch 63 when the contacts 64 of the switch 61 are operated open. The solenoid 60 operating mechanism of the switch 61 includes a time delay circuit (not shown), which is effective to delay energisation of the operating solenoid for a predetermined period after current commences flowing in the circuit. This switch also has a toggle action which latches the contacts either in the open or in the closed position, depending upon in which direction the switch has been operated, and also a cam abutment 66 which co-operates with a cam carried by the brake controller to close the contacts 64 when the brake controller is moved to the re-set position.

In the normal running state the contact 64 closed while the emergency line 11 energises the coil 64 to hold open the contact 62, therefore the brake actuator s normally controlled by the service brake application unit 6. In an emergency, as previously described, the emergency line 11 is de-energised allowing the bias spring switch 63 to close the contact 62 so that the emergency power battery 7 is connected to operate the motor 1 to bring into effect emergency braking. After the time delay period of switch 61 its solenoid 60 energises and operates to open the contacts 64, whereupon the push rod also mechanically opens the contacts 62 braking both the emergency power and emergency line circuits. The time delay period of switch 61 is selected so that the motor 1 will have driven the brake to the emergency brake position which is then held by engagement of the ratchet mechanism 3, 4.

When the emergency has been cleared and it is wished to re-set the system to the normal running position the brake controller is moved to the re-set position, in which the contact 16 are closed and the cam mechanically operates the switch 61 to close the contact 64 so that continuity is restored to the emergency line 11, which in turn re-energises the solenoid 65 and the contacts 62 are again held open against their bias.

It was mentioned in the introduction that in an emergency brake application the prime-mover is driven to a furthest extent of its movement, it will be understood that this is not represented by a fixed actuator extention length. In practice the length by which the actuator output member is extended will be governed by the amount of braking block wear subsisting and also may be governed by a loud sensing unit which will determine an emergency load limit in accordance with the maximum achievable retardation for the vehicle weight.

I claim:

1. An actuator emergency operation circuit for an electric actuator having an electric motor normally operable to produce an output which controls an output force exerted by an actuator output member in accordance with a control signal input to a control means for controlling normal operation of the motor, the emergency operation circuit comprising an emergency power circuit connected between the motor and a source of stored electrical energy sufficient for the motor to drive the output member to a predeteremined position, the emergency power circuit including means responsive to an emergency input for connecting the stored energy source to the motor so as to drive the actuator output member to the predetermined position thereof, said emergency power circuit further including first means, operative after the output member has been driven to the said perdetermined position, for disconnecting the source of stored electrical energy from the motor, and second, electrically energizable means for latching the output member in said predetermined position and for, responsive to being electrically energized, releasing latching of the output member, said second means including an electric current energizing path over which said second means is electrically energized and said emergency power circuit further comprising switch means, connected in said electric current energizing path and responsive to the amount of electrical energy stored by the stored electrical energy source, for preventing energization of said second means and thus preventing release of the latching of said output member when the amount of electrical energy stored by said source is insufficient to energize the motor to drive the actuator output member to said predetermined position for a further emergency operation.

2. A circuit as claimed in claim 1 wherein the first means comprises switch means operable responsive the output member reaching said predetermined position.

3. A circuit as claimed in claim 1 further comprising timing means for providing operation of said first means after an elapsed time sufficient for the output member to have been driven by the motor to the predetermined position.

4. A circuit as claimed in claim 1 wherein the second meand provides latching of said actuator output member in response to an emergency input signal which permits the motor to drive an actuator output member only in a direction towards said predetermined position.

5. A circuit as claimed in claim 4 wherein said second means comprises an electrically released, spring engaged pawl.

6. A circuit as claimed in claim 1 wherein the stored energy source comprises a battery capable of storing sufficient electrical energy for energizing the motor to drive the actuator output member to said predetermined position during at least one emergency operation.

7. A circuit according to claim 1 for connection in a railway vehicle braking system wherein the output member is connected to operate the brakes of a railway vehicle.

* * * * *